United States Patent [19]

Noguchi

[11] Patent Number: 4,992,294
[45] Date of Patent: Feb. 12, 1991

[54] METHODS OF PRODUCING SOYBEAN MILK AND BEAN CURD

[76] Inventor: Kenmei Noguchi, 808, Nishinoban, Toyama-shi, Toyama-ken, Japan

[21] Appl. No.: 307,827

[22] Filed: Feb. 7, 1989

[30] Foreign Application Priority Data

Feb. 8, 1988 [JP] Japan .................................. 63-25743
Feb. 9, 1988 [JP] Japan .................................. 63-26535

[51] Int. Cl.⁵ ............................ A23J 1/14; A23L 3/14
[52] U.S. Cl. ...................................... 426/634; 426/656
[58] Field of Search ................................ 426/656, 634

[56] References Cited

U.S. PATENT DOCUMENTS

| | | | |
|---|---|---|---|
| 3,901,978 | 8/1975 | Nelson et al. | 426/634 |
| 4,035,194 | 7/1977 | Grassl | 426/634 |
| 4,147,811 | 4/1979 | Abe | 426/656 |
| 4,194,018 | 3/1980 | Hodel et al. | 426/634 |
| 4,664,930 | 5/1987 | Moriya | 426/634 |
| 4,678,677 | 7/1987 | Sugisawa et al. | 426/656 |

FOREIGN PATENT DOCUMENTS

1268147 11/1986 Japan .................................. 426/634

Primary Examiner—Donald E. Czaja
Assistant Examiner—Helen Pratt
Attorney, Agent, or Firm—Michael N. Meller

[57] ABSTRACT

There are disclosed a method of producing soybean milk having no smell of soybean and a method of producing bean curd from the soybean milk. The method of producing soybean milk includes a step of soaking soybeans in water and grinding the soaked soybeans to obtain a go-eki, a step of boiling, cooling and again boiling the go-eki, and a step of straining the boiled go-eki to obtain soybean milk. A magnesium chloride-type bittern is added to the soybean milk to coagulate and make it into bean curd. In this case, the whole quantity of the required bittern is added at a time to the soybean milk being agitated. The type of the bean curd produced is determined depending on whether the agitated flow of the soybean milk is immediately stopped or the agitation of the soybean milk is continued slowly after the bittern has been added.

9 Claims, 5 Drawing Sheets

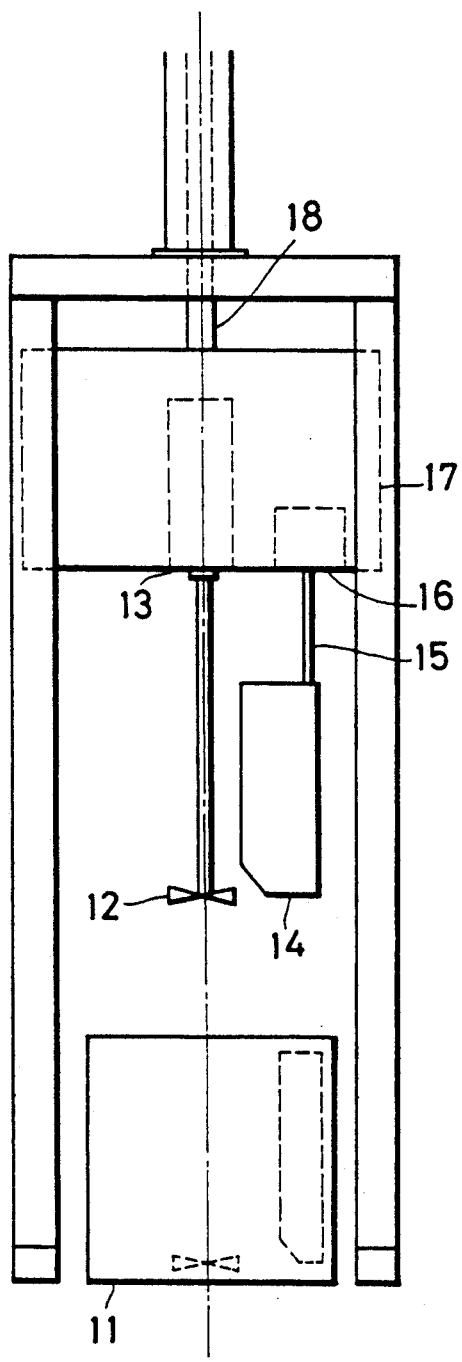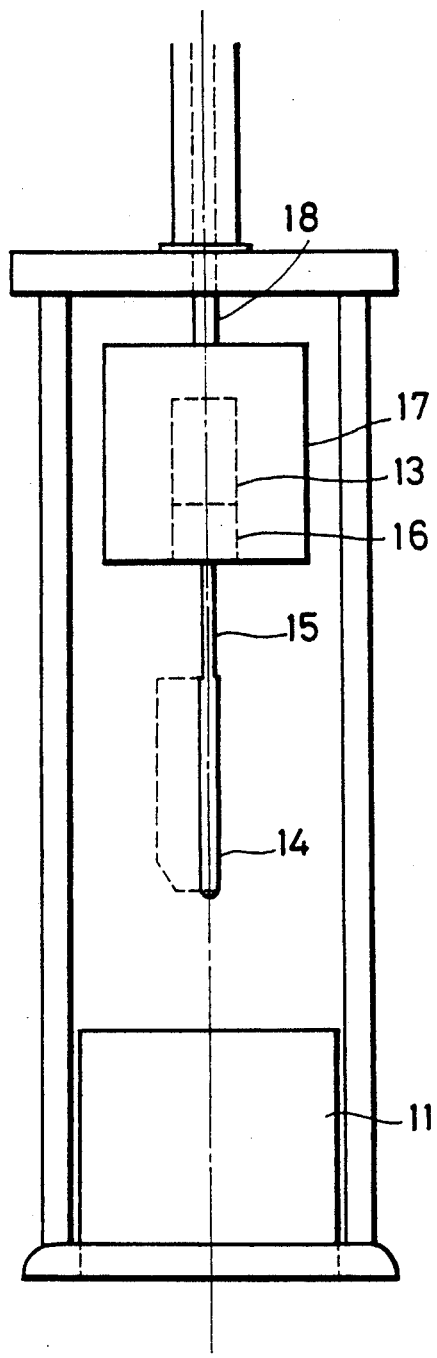

FIG.4

```
┌─────────────────────────────┐
│   SOYBEAN MILK, 15 liters   │
└──────────────┬──────────────┘
┌──────────────┴──────────────┐
│ COOL BY LEAVING TO STAND    │
│ OR APPLY HEAT ( SOLIDIFYING │
│ CONTAINER CONCURRENTLY SERVING│
│ AS FORMING CONTAINER ) 70~73°C│
└──────────────┬──────────────┘
┌──────────────┴──────────────┐
│ ADD 35g OF GRANULAR BITTER  │
│ HAVING PARTICLE SIZE OF 3.5 │
│ ~1 mm UNIFORMLY AT A TIME   │
└──────────────┬──────────────┘
┌──────────────┴──────────────┐
│ AGITATE SLOWLY WITH PLACING │
└──────────────┬──────────────┘
┌──────────────┴──────────────┐
│ AGITATE SLOWLY WITH         │
│ PLACING PLATE               │
└──────────────┬──────────────┘
┌──────────────┴──────────────┐
│ LEAVE AT REST FOR           │
│ 10~15 min.                  │
└──────────────┬──────────────┘
┌──────────────┴──────────────┐
│ SILK TYPE BEAN CURD         │
└──────────────┬──────────────┘
┌──────────────┴──────────────┐
│ SOAK IN COLD WATER          │
│ ( BELOW 17°C ) FOR          │
│ 4~6 hours                   │
└──────────────┬──────────────┘
┌──────────────┴──────────────┐
│ MATURE OVERNIGHT            │
│ IN REFRIGERATOR             │
│ ( BELOW 5°C )               │
└──────────────┬──────────────┘
┌──────────────┴──────────────┐
│ SHIPPING                    │
└─────────────────────────────┘
```

METHODS OF PRODUCING SOYBEAN MILK AND BEAN CURD

BACKGROUND OF THE INVENTION

The present invention relates to method of producing an odorless soybean milk having no smell of soybean and a method of producing tofu (bean curd) using bittern.

In the past, soybean milk has been produced by fully soaking soybeans in water, grinding the soaked soybeans, adding water to the thus ground soybeans (the resulting solution is referred to as a go-eki) and boiling and straining the go-eki through a piece of cloth.

On the other hand, bean curd has been produced by coagulating the soybean milk with bittern (the principal component is magnesium chloride) which is a coagulant and the production of bean curd has been made by a workman by hand thus still considerably retaining the character of domestic industry up to quite recently.

Because the reactivity of magnesium chloride has been so high that skill is required for the production of bean curd and therefore the production of bean curd has been considered to be unsuitable for mass production.

However, due to the fact that there had been a time when it was difficult to obtain magnesium chloride and also due to the excessively high reactivity of the magnesium chloride, the use of calcium sulfate or glucono delta lactone as a coagulant has begun several tens years ago and quite different types of bean curd from those made by the old and traditional production method have been placed in large quantities on the market.

Presently, the types of bean curd available in large quantities on the market can be divided broadly into three classes of so called cotton type bean curd of the rather tough kind, silk type bean curd of the soft kind and fill-in type bean curd of the kind filled in a sealed package.

In recent years, there has been an increasing voice for natural food and therefore the demand for soybean milk as a natural drink or a raw material for bean curd has been increasing. Also, while mass-produced inexpensive packaged bean curds have become available in these modern days, there has been a rapid growth in the demand for bean curd of the conventional type employing bittern and containing no artificial additive.

However, soybean milk made from soybeans has had a peculiar smell of soybean and spices, chemicals, etc., have been added to drown the smell of soybean, thus making the resulting soybean milk far from the one that can be considered as a natural drink.

Also, with the bean curd of the type employing the bittern, the reactivity of the bittern has been so high as mentioned previously that the coagulation process requires skill. As a result, the production of such bean curd by machinery has not been realized as desired and the production has been effected by a hand method, thereby supplying bean curd made on a small scale and hence expensive only to the local market.

In addition, the disposal of bean curd refuse resulting in the course of the production of bean curd has presented a problem in small-scale bean curd factories.

Moreover, due to the high reactivity of bittern, the production of silk type bean curd has been made only by using calcium sulfate and glucono delta lactone as coagulating agents.

Further, after the production of the bean curd, the long-distance transport has involved the danger of the bean curd getting out of shape during the transport due to it being so soft.

SUMMARY OF THE INVENTION

It is the primary object of the present invention to provide a method of producing soybean milk and bean curd capable of producing soybean milk free of a peculiar smell of soybean and producing bean curd of the type employing bittern, low in cost and producible by machinery as well as adapted for supply over far and wide areas.

To accomplish the above object, in accordance with a first aspect of the invention there is provided a method of producing soybean milk comprising soaking soybeans in water and grinding the soaked soybeans to obtain a so-called go-eki, boiling the go-eki and straining the boiled go-eki to separate into soybean milk and bean-curd refuse. In the course of boiling the go-eki, the go-eki is boiled at 110° to 120° C, cooled by the addition of water and again boiled at 110° to 120° C.

In accordance with a second aspect of the invention, there is provided a method of producing bean curd by coagulating soybean milk with a coagulating agent. The soybean milk used comprises the one obtained by the method of the first aspect and the coagulating agent consists of bittern mainly composed of magnesium chloride. When adding the bittern to the soybean milk, a given amount of the bittern is added at a time to the soybean milk being agitated in a container equipped with an agitator and simultaneously the agitated flow is stopped instantaneously, thereby coagulating the soybean milk.

In accordance with a third aspect of the invention, there is provided a method of producing bean curd by coagulating soybean milk with a coagulating agent, in which using the soybean milk obtained by the method of the first aspect and a granular bittern consisting mainly of magnesium chloride as the coagulating agent, a given amount of the bittern is added at a time uniformly to the soybean milk in a container concurrently serving the purpose of shaping and the mixture is instantaneously agitated, thereby coagulating it.

In accordance with a fourth aspect of the invention, there is provided a method of producing bean curd by coagulating soybean milk with a coagulating agent, in which bittern mainly consisting of magnesium chloride as the coagulating agent is used, the bittern is added in such a manner that while agitating the soybean milk in a container equipped with an agitator, a given amount of the bittern is added at a time and simultaneously the agitated flow is stopped instantaneously, thereby coagulating the soybean milk.

In accordance with a fifth aspect of the invention, there is provided a method of producing bean curd by coagulating soybean milk with a coagulating agent, in which a granular bittern mainly consisting of magnesium chloride as the coagulating agent is used, a given amount of the bittern is added at a time uniformly to the soybean milk in a container concurrently serving the shaping purposes and the mixture is instantaneously agitated slowly, thereby effecting the coagulation.

With the methods of producing bean curd according to the aspects 2 to 5, it is preferable to comprise additional steps such that after the coagulated soybean milk has been shaped, it is matured for 5 to 8 hours at 5° C or less under the condition of water immersion.

With the methods of producing bean curd according to the aspects 2 to 5, preferably a first place of production for making soybean milk and one or more places of production for making bean curd are arranged separately so that the soybean milk produced at the first place of production is transported to the second place of production where the soybean milk is made into bean curd.

With the method of producing soybean milk according to the first aspect, the step of boiling the go-eki comprises boiling the go-eki at 110° to 120° C for 7 to 10 minutes, cooling it by the addition of water and boiling it again at 110° to 120° C for 3 to 4 minutes. By so doing, the odorous principle of soybean is evaporated or thermally decomposed.

With the method of producing bean curd according to the second or fourth aspect, the coagulating step comprises adding a given required amount of bittern at a time to the soybean milk agitated voilently and stopping the agitated flow instantaneously, and thus there is the effect of uniformly mixing the bittern and making uniform cotton type bean curd.

Also, with the method of producing bean curd according to the third or fifth aspect, the granular bittern is used in a manner that preferably the bittern is added at a time in such a manner that it is uniformly lined on the surface of the soybean milk and the soybean milk is agitated slowly before the granular bittern melts into the soybean milk, thereby making uniform silk type bean curd.

Further, with the methods of producing bean curd according to the second to fifth aspects, after its shaping, the bean curd may be matured for 5 to 8 hours at 5° C or less under the condition of immersion in water, thereby increasing the toughness and resilience of the bean curd. By so doing, particularly during the long-distance transport there is the less danger of the bean curd getting out of shape in transit even in the absence of any strict anti-vibration measure.

Lastly, with the methods of producing bean curd according to the second to fifth aspects, by separately arranging a first place of production for soybean milk producing purposes and a second place of production for bean curd producing purposes to be apart from each other so that the soybean milk produced at the first place of production is transported to the second place of production to make the soybean milk into bean curd, it is possible to supply fresh bean curd to far and wide areas and also the elimination of the soybean milk production process at the second place of production makes it possible to produce and directly sell bean curd in a limited space such as a shop front or the booth at a corner of a supermarket.

As described hereinabove, in accordance with the invention the step of producing soybean milk is such that the go-eki is boiled at about 120° C, watered for cooling, boiled again at about 120° C and strained to obtain soybean milk, so that the soybean milk has no smell of soybean and the resulting bean curd is not easily rotten.

Further, in the production of cotton type bean curd, after the soybean milk has been agitated in a container equipped with an agitator, bittern is added and simultaneously the agitated flow is stopped by a stop plate, thereby making possible the production by machinery of "cotton type bean curd employing bittern" which has hithertofore been considered difficult due to the coagulation rate of the bittern.

Similarly, in the production of silk type bean curd, a crystalline-state bittern is added at a time uniformly and the soybean milk is slowly agitated with an agitating plate to coagulate it, thereby making possible the production by machinery of "silk type bean curd employing bitter" which has heretofore been considered difficult due to the coagulation rate of the bittern.

Still further, after the coagulated soybean milk has been shaped, the bean curd is matured overnight at 5° C or less with the result that the bean curd is coagulated to a greater degree and is increased in strength and resilience, thereby making the bean curd not easily get of shape and withstand the transportation to a long distance.

Lastly, by separately arranging the place of soybean milk production and the place of bean curd production, it is possible to supply fresh bean curd to far and wide areas.

BRIEF DESCRIPTION OF THE DRAWINGS

FIG.3A and 3B are respectively a front view and side view showing the construction of a cotton type bean curd coagulating apparatus.

FIG.4 is a flow sheet showing an embodiment of a method of producing silk type bean curd according to the invention.

DESCRIPTION OF THE PREFERRED EMBODIMENTS

Methods of producing soybean milk and bean curd according to preferred embodiments of the present invention will now be described.

A: Production of odorless soybean milk

Figure 1:
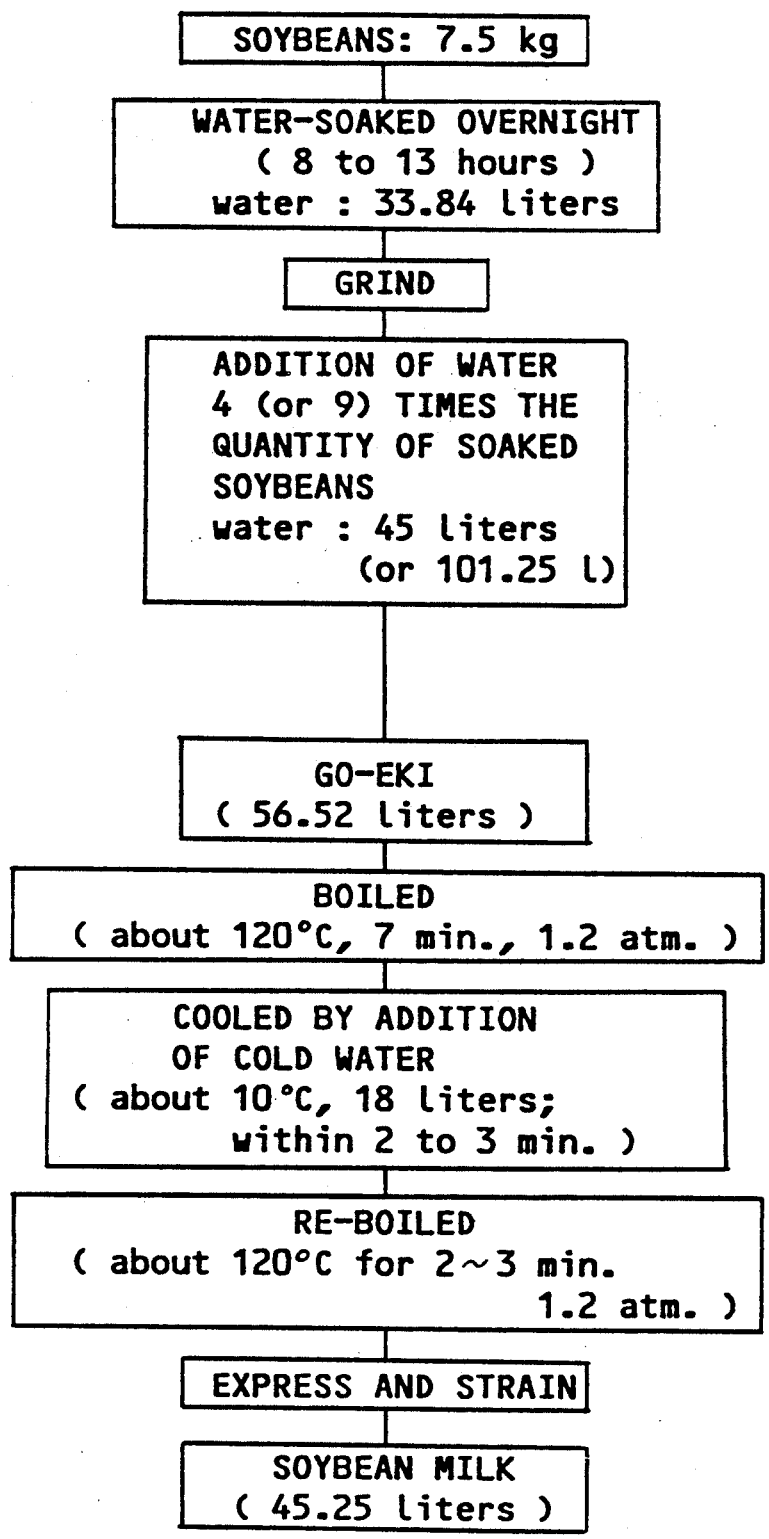
FIG.1 is a flow sheet showing an embodiment of a method of producing odorless soybean milk according to the present invention.

Referring to FIG.1, there is illustrated a flow sheet showing an embodiment of a method of producing an odorless soybean milk according to the invention.

7.5kg of soybeans are thoroughly soaked overnight (8 to 13 hours) in water (about 34 liters) to get the resulting soaked soybeans of 11.25kg. The soaked soybeans are ground, and after the addition of water which is about 4 times (45 liters) or about 9 times (100 liters) the weight of soaked soybeans, the resulting solution (hereinafter referred to as a go-eki) (the total quantity is about 56.5 liters when the water is 4 times) is boiled at about 120° C and at (1.2 atm.) for 7 minutes in a pressure cooker and then cold water (18 liters) is added in 2 to 3 minutes. At this time, the temperature of the go-eki is decreased temporarily to about 90° C. After the addition of the cold water, the go-eki is again increased in temperature to about 120° C, boiled for 3 to 4 minutes and then expressed and strained to remove bean-curd refuse. The resulting liquid is called as soybean milk (the total quantity is about 45 liters). As the result of this process, the miscellaneous bacteria in the soybean milk are destroyed and the odor peculiar to the soybeans is removed.

Employing a panel including 7 random members, a comparative sampling test was made on the odorless soybean milk produced by the above-mentioned process and a conventional soybean milk of the type boiled at about 100° C in the blind trial condition. The results obtained are shown in the following Table 1.

TABLE 1

| Panel member | Smell A | Smell B | Taste A | Taste B |
|---|---|---|---|---|
| 1 | | ◉ | | ○ |
| 2 | | ◉ | △ | △ |
| 3 | | ◉ | | ◉ |
| 4 | | ◉ | | ◉ |
| 5 | | ◉ | | ○ |
| 6 | | ◉ | △ | △ |
| 7 | | ○ | | ◉ |

In the Table, A designates the conventional soybean milk and B designates the soybean milk of the invention. Each of marks, ◉, ○ and △ was attached to better one of the two. The mark ◉ indicates and appraisal of very tasty, ○ an appraisal of tasty and △ an appraisal of little difference between the two.

In accordance with the invention, while the smell of soybean is removed and at the same time the miscellaneous bacteria are destroyed, the soybean milk in the sterile condition is subjected to closed cooling so that is may be effectively utilized later.

The following Table 2 shows the results of a comparison between the number of general live bacterial in three samples No.1 to 3 of the soybean milk produced according to the invention, cooled to 20° C in a container to which a cooling pipe was attached to supply running water and stored for 3 days in a refrigerator of 5° C (open cooling) and the number of general live bacteria in three samples No.1 to 3 of the soybean milk produced according to the invention, cooled to 20° C with a running water in a closed container shut off from the external air and stored for 3 days in a refrigerator of 5° C (closed cooling).

TABLE 2

| Sample No. | Open cooling | Closed cooling |
|---|---|---|
| 1 | $2.2 \times 10^4$/g | Less than 100/g |
| 2 | $4.4 \times 10^3$/g | Less than 100/g |
| 3 | $2.5 \times 10^3$/g | Less than 100/g |

From Table 2 it will be seen that the soybean milk undergoing the closed cooling includes general live bacteria of less than 100/g even after 3 days showing that the soybean milk according to the invention can be sealed in and subjected to the closed cooling in a closed container so that it is shipped in a low temperature condition (5° C or less) as a raw material for bean curd, and thus there is no restriction with respect to the place of production for the below-mentioned types of bean curd.

B: Production of cotton type bean curd

Figure 2:
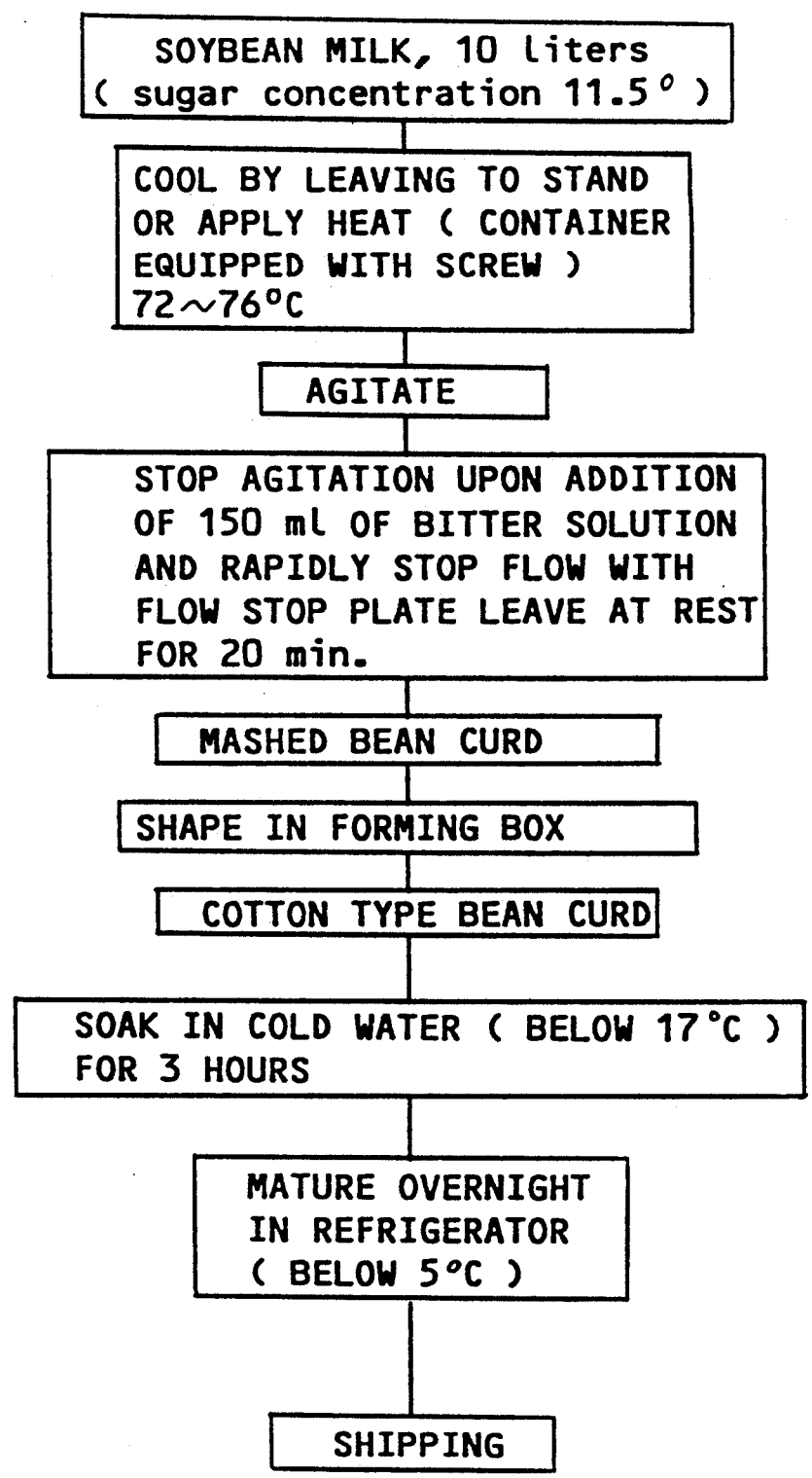
FIG.2 is a flow sheet showing an embodiment of a method of producing cotton type bean curd according to the invention.

Referring to FIG.2, there is illustrated a flow sheet showing an embodiment of a method of producing cotton type bean curd according to the invention.

FIGS.3A and 3B show respectively a front view and side view showing the construction of a cotton type bean curd coagulating apparatus. In the Figures, numeral 11 designates a coagulating container containing soybean milk, 12 an agitator provided with a screw at its forward end, 13 a motor for turning the agitator 12, 14 a stop plate for stopping the flow of the soybean milk stirred by the agitator 12, 16 a turning mechanism for turning the stop plate 14 about a supporting rod 15, and 17 a drive box incorporating the motor 13 and the turning mechanism 16 and movable vertically along a supporting rod 18.

The soybean milk used was 10 liters of the previously mentioned odorless soybean milk produced by adding water about 9 times the weight of soybeans and it was poured into the coagulating container 11 after raising its temperature in the case of the low-temperature soybean milk. When the temperature of the soybean milk reached 72° to 76° C, the drive box 17 was lowered to a desired position thereby immersing the agitator 12 and the stop plate 14 in the soybean milk. The soybean milk was violently stirred by the agitator 12 until it swirled. At this time, the stop plate 14 was turned in a direction which would not impede the flow of the soybean milk.

After the soybean milk had been agitated violently, 150ml of the commercially available bittern solution was added at a time (this is referred to as treating with the bittern) and simultaneously the agitator 12 was stopped and the stop plate 14 was turned to be perpendicular to the flow, thereby rapidly stopping the flow. In 2 to 3 seconds after the treatment with the bittern, the protein of the soybean milk 11 was separated from the water and resulted in a white mash-like mass (this is referred to as a mashed bean curd). In this condition, the mash-like mass was left at rest for about 20 minutes, thereby completing the production of the mashed bean curd.

Then, the drive box 17 was raised so that the coagulating container 11 was taken out and the produced mashed bean curd was placed in a given former. Then, a plate having a pressure of about 5g per 1cm$^2$ was placed on the mashed bean curd to express and shape it for 20 minutes.

The product was cut to pieces of a desired size, immersed in clear water for about 3 hours to cool them to 17° C or below, cooled to 5° C or less in a refrigerator and matured overnight (about 7 hours). As a result of this maturing, the solidification of the bean curds was facilitated thereby producing cotton type bean curds having less tendency to get out of shape.

Also, in accordance with the present method of producing cotton type bean curd, the charging of a given amount of bittern required no skill and therefore even an utter 14 unskilled person can effect the production.

C: Production of silk type bean curd

Referring to FIG.4, there is illustrated a flow sheet showing an embodiment of a method of producing silk type bean curd according to the invention.

Figure 5:
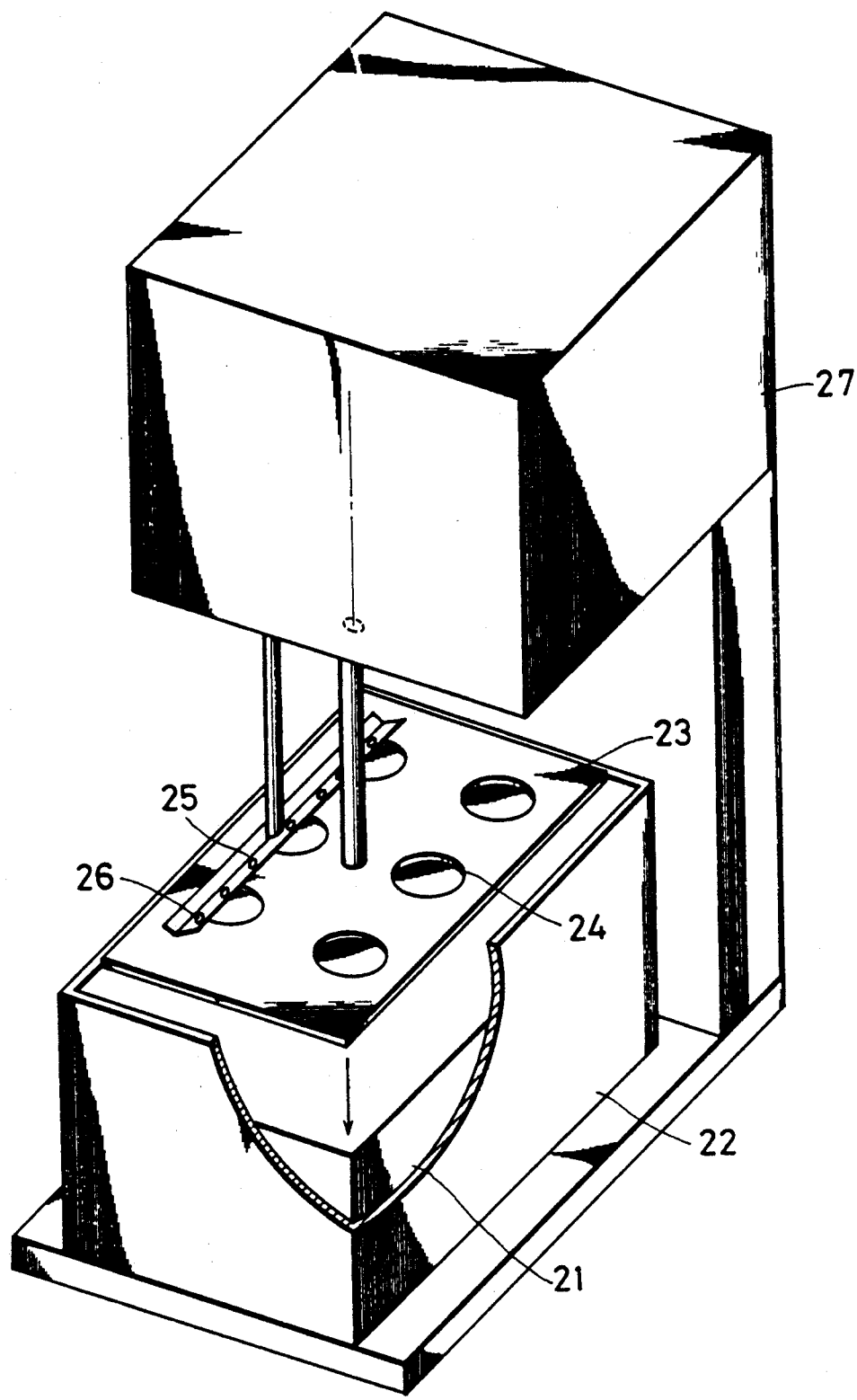
FIG.5 is a perspective view showing the construction of a silk type bean curd coagulating apparatus.

FIG.5 is a perspective view showing the construction of a silk type bean curd coagulating apparatus.

In the Figure, numeral 21 designates soybean milk, 22 a rectangular coagulating container concurrently serving as a forming container and containing the soybean milk 21, 23 a placing plate made slightly smaller than the internal shape of the coagulating container 22 and having a plurality of holes 24 opening to the inside of the container 22, and 25 a plate extended over the coagulating container 22 carrying bittern 26 thereon at regular intervals. Numeral 27 designates a drive box mounting therein a drive unit for vertically moving the placing plate 23.

The soybean milk used was 15 liters of the previously mentioned odorless soybean milk obtained by adding water 4 times the weight of soybeans and it was introduced into the coagulating container 22 after raising the temperature in the case of the low temperature soybean milk. When the temperature of the soybean milk 21 reached 70° to 73° C, 35g of the commercially available granular bittern 26 having a particle size of 3.5 to 1mm was uniformaly arranged on the plate 25 and added at a time to the soybeam milk 21. Immediately the soybean milk 21 was agitated by slowly moving the placing plate 23 vertically once or twice and then left at rest for 10 to 15 minutes to coagulate it.

After the coagulation, the resulting bean curd was cut to pieces of a desired size, immersed in clear water for 4 to 6 hours to cool them to 17° C or less, cooled to 5° C or less in a refrigerator and then matured overnight (about 7 hours).

By virtue of this maturing, the solidification of the bean curds was promoted thereby producing silk type bean curds having less tendency to get out of shape.

Also, in accordance with the present method of producing silk type bean curd, the charging of a given amount of bittern requires no skill and therefore the production can be effected by even an utter 14 unskilled person.

D: Strength test of bean curds

Bean curd strength tests were made on four types of bean curd, i.e., the conventional fill-in type bean curd (silk type employing glucono delta lactone), the silk type bean curd according to the invention embodiment, the conventional cotton type bean curd (employing calcium sulfate) and the cotton type bean curd according to the invention embodiment. With respect to each of the invention embodiments, the test was made on the two kinds of bean curd one of which was tested at 10 minutes after the production and the other was tested after the maturing overnight.

The method consisted of using the six kinds (four types) of bean curd, cutting and shaping each piece of bean curd to a desired size (10cm × 10cm × 3.5cm), placing a plastic sheet of 2cm² (the thickness was 0.05mm) on the central portion of each piece of bean curd and placing weights one upon another on each plastic sheet. Also, after placing weights one upon another on each plastic sheet, the weights were removed to observe the restoration of the bean curd.

The results of the tests are shown in the following Table 3.

TABLE 3

| Product type | Conditions |
| --- | --- |
| Silk type bean curd Conventional | |
| Fill-in type bean curd | Depression of 2 mm after 1 minute under 45 g and no restoration |
| Invention embodiment | |
| 10 minutes after completion | Depression of 1 mm after 1 minute under 55 g and restored after 5 minutes |
| After maturing overnight | Depression of 2 mm after 1 minute under 130 g and restored after 5 minutes |
| Cotton type bean curd Conventional | |
| Cotton type bean curd | Depression of 2 mm after 1 minute under 150 g and no restoration |
| Invention embodiment | |
| 10 minutes after completion | Depression of 1 mm after 1 minute under 230 g and no restoration |
| After maturing overnight | No depression under 300 g and more |

It was seen that the silk type bean curd and the cotton type bean curd according to the embodiments of the invention were higher in strength and also higher in resilience due to their restoration than the conventional silk type bean curd and cotton type bean curd. Also, it was seen that of the two types made according to each embodiment, the one matured overnight was higher in both strength and resilience than the other.

Lastly, by virtue of the fact that the soybean milk produced by the method of producing soybean milk according to the invention is sealed in a sealed container and subjected to closed cooling thereby making it possible to ship the soybean milk in a low-temperature condition (5° C or less) as a raw material for bean curd, the place of production for soybean milk and the place of bean curd production for performing the method of producing bean curd according to the invention may be separately selected perform the production thereby supplying bean curd to far and wide areas. In addition, the saving of labor and space for the production process of soybean milk can be realized at the place of bean curd production and there is no longer any elimination of bean curd refuse which has hitherto been eliminated during the production process of soybean milk thus giving rise to some environmental problem, whereas a way for collective reuse as a resource of the bean-curd refuse eliminated in a large quantity is found at the place of production for soybean milk.

What is claimed is:

1. In a method of producing soybean milk including the steps of soaking soybeans in water, grinding the soaked soybeans to make a mixed solution, boiling the solution and straining the boiled solution to produce soybean milk, the improvement wherein the boiling of the solution further comprises:

a first boiling step for boiling said solution at a temperature between 110° to 120° C under pressure of about 1.2 atmospheres;

a step for cooling said boiled solution by adding cool water thereto; and a subsequent second boiling step for boiling said cooled solution at a temperature between 100° and 120° C under pressure of 1.2 atmospheres.

2. In a method of producing a cotton type bean curd including the steps of coagulating the protein component of said soybean milk obtained by said method described in claim 1 by the use of a coagulating agent consisting of bittern of which the principal component is magnesium chloride; and putting said coagulated protein component in a given former to express and shape for 20 minutes, then shipping, the improvement being comprised in that said bittern is added to said soybean milk at the liquid temperature of 72° to 77° C, the soybean milk is given a rotary flow by agitation of an agitator, and as soon as a predetermined quantity of said bittern has been added to the soybean milk, the rotary flow thereof is stopped to cause turbulence, thereby mixing said bittern with said soybean milk and coagulating the protein component of said soybean milk.

3. In a method of producing a cotton type bean curd including the steps of coagulating the protein component of said soybean milk obtained by said method described in claim 1 by the use of a coagulating agent consisting of bittern whose principal component is magnesium chloride; putting said coagulated protein component in a given former to express and shape for 20 minutes and then shipping it, the improvement being comprised in that said coagulated protein component is immersed in water for cooling after being shaped in said former, then matured for 5 to 8 hours at a temperature of 5° C or lower, and shipped thereafter as a cotton type bean curd.

4. In a method of producing a silk type bean curd including the steps of introducing said soybean milk obtained by said method described in claim 1 into a coagulating and forming container, coagulating said soybean milk wholly by the use of a coagulating agent consisting of bittern whose principal component is magnesium chloride, further cutting said coagulated soybean milk in said container to a predetermined form, and then shipping it, the improvement being comprised in that said bittern used is a crystalline-state bittern consisting mainly of magnesium chloride, a predetermined quantity of said crystalline-state bittern being added uniformly to said soybean milk at a temperature of 72° to 77° C, and said soybean milk is slowly agitated for about 1 to 2 minutes in order to be coagulated wholly.

5. In a method of producing a silk type bean curd including the steps of introducing said soybean milk obtained by said method described in claim 1 into a coagulating and forming container, coagulating said soybean milk wholly by the use of a coagulating agent consisting of bittern whose principal component is magnesium chloride, further cutting said coagulated soybean milk in said container to a predetermined form, and then shipping it, the improvement being comprised in that said coagulated soybean milk is immersed in water for cooling, then matured for 5 to 8 hours at a temperature of 5° C. or lower, and shipping thereafter as a silk type bean curd.

6. In a method of producing soybean milk as claimed in claim 1, the improvement being comprised in that in said first boiling step, the soy bean solution is boiled for 7 to 10 minutes at a temperature of 110° to 120° C under pressure of about 1.2 atmospheres and, in said second boiling step, the soy bean solution boiled in the first step is further boiled for 3 to 4 minutes at a temperature of 110° to 120° C under pressure of 1.2 atmospheres.

7. A method of producing a bean curd which comprises coagulating the protein component of the soybean milk obtained by the method of claim 1.

8. A method of producing a cotton type bean curd wherein the protein component of the soybean milk obtained by the method of claim 1 is coagulated by the use of a coagulating agent consisting only of bittern of which the principal component is magnesium chloride, said coagulated protein component is put in a given former to express and shape it, then shipped.

9. A method of producing a silk type bean curd wherein the soybean milk obtained by the method of claim 1 is introduced into a coagulating and forming container, the soybean milk is coagulated wholly by the use of a coagulating agent consisting only of bittern whose principal component is magnesium chloride, the coagulated soybean milk in the container is cut to a predetermined form, then shipped.

* * * * *